United States Patent [19]
Ford et al.

[11] Patent Number: 6,066,844
[45] Date of Patent: May 23, 2000

[54] OPTICAL RECEIVER WITH INTEGRATED VARIABLE ATTENUATOR

[75] Inventors: Joseph Earl Ford, Oakhurst; James Albert Walker, Howell, both of N.J.

[73] Assignee: Lucent Technologies Inc., Murray Hill, N.J.

[21] Appl. No.: 09/036,189

[22] Filed: Mar. 7, 1998

[51] Int. Cl.$^7$ .................................................. G01J 1/34
[52] U.S. Cl. .............................. 250/227.21; 250/201.1; 250/208.2
[58] Field of Search ................................ 250/201.1, 205, 250/208.2, 227.11, 227.21

[56] References Cited

U.S. PATENT DOCUMENTS

| | | | |
|---|---|---|---|
| 4,644,145 | 2/1987 | Gündner | 250/205 |
| 5,767,997 | 6/1998 | Bishop et al. | 359/152 |

OTHER PUBLICATIONS

Goossen et al., Silicon Modulator Based on Mechanically–ctive Anti–Reflection Layer with 1 Mbit/sec Capability for Fiber–in–the–Loop Applications, IEEE Photonics Technology Letters, vol. 6 No. 9, pp. 1119–1121, Sep. 1994.

*Primary Examiner*—Edward P. Westin
*Assistant Examiner*—Glenn Kinnear
*Attorney, Agent, or Firm*—Gibbons, Del Deo, Dolan Griffinger and Vecchione

[57] ABSTRACT

An optical assembly for detecting an optical signal from a signal source in systems where the intensity of the optical signal may surpass the operational range of the optical detector being used. The optical assembly includes an optical detector for converting the optical input signal into a corresponding electrical output signal. The optical detector has a set operational range of input signal intensities. An attenuator is disposed between the optical detector and the signal source. The attenuator is capable of reducing the signal intensity of the optical signal if required so that the optical signal falls within the operational range of the optical detector. A controller is electronically coupled to both the optical detector and the attenuator. The controller controls the attenuator as a function of the output signal of the optical detector, wherein the attenuator attenuates the optical signal to fall within the operational range of the optical detector.

5 Claims, 2 Drawing Sheets

OPTICAL RECEIVER WITH INTEGRATED VARIABLE ATTENUATOR

BACKGROUND OF THE INVENTION

1. Field of the Invention

The present invention relates to optical systems that utilize an attenuator to selectively attenuate an optical signal sent from a signal source to a detector over an optical fiber. More particularly, the present invention relates to the structure of the attenuator and the optical detector as well as the control systems for both the attenuator and the optical detector.

2. Description of the Prior Art

In optical data communications, signals are typically transmitted from a signal source to a signal receiver over an optical fiber network. Optical signal receivers have a signal intensity range in which they function best. If a signal falls below the operational range, the optical signal receiver may fail to detect the signal. Alternatively, if the intensity of a signal exceeds the operational range of the optical signal receiver, the receiver may become saturated and register nonlinear effects.

In the field of optical data communications, optical signals are typically received either by a digital optical receiver or an analog optical receiver. In general, digital optical receivers have a greater signal intensity range than do analog optical receivers. For example, the Model 1319 high-speed digital receiver manufactured by Lucent Technologies, Inc. of Murry Hill, N.J. has a dynamic operational range of approximately 25 dB. However, analog optical receivers have a typical dynamic operational range of between 3 dB and 5 dB. For these reasons, in optical data communications systems, especially those that use analog optical receivers, the optical receiver, must be matched to the signal strength at the point of signal reception. If the signal source changes, or the optical fiber network is altered, the optical receivers must be adjusted or replaced to match any change in the received signal intensity.

A need therefore exists in the art for a system that automatically attenuates a signal received by an optical receiver so that the signal read by the optical receiver falls within its operational range. Such a system would eliminate the need to adjust or replace the optical detectors in a system should the signal intensity in an optical fiber system change for any reason.

SUMMARY OF THE INVENTION

The present invention is an optical assembly for detecting an optical signal from a signal source in systems where the intensity of the optical signal may surpass the operational range of the optical detector being used. The optical assembly includes an optical detector for converting the optical input signal into a corresponding electrical output signal. The optical detector has a set operational range of input signal intensities which may or may not include the optical signal produced by the signal source. An attenuator is disposed between the optical detector and the signal source. The attenuator is capable of reducing the signal intensity of the optical signal if required so that the optical signal falls within the operational range of the optical detector.

A controller is electronically coupled to both the optical detector and the attenuator. The controller controls the attenuator as a function of the output signal of the optical detector, wherein the attenuator attenuates the optical signal to fall within the operational range of the optical detector.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
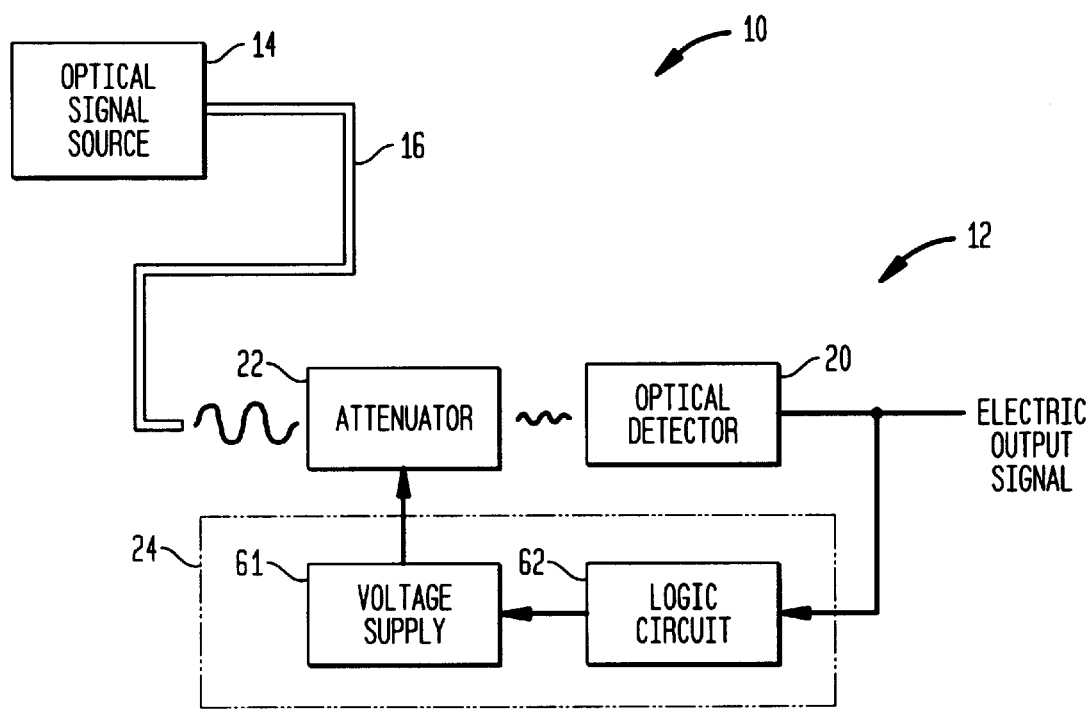
FIG. 1 is a block diagram view of an optical system containing an optical receiver in accordance with the present invention.

Referring to FIG. 1, there is shown an optical system 10 that includes an optical receiver assembly 12. The optical system 10 contains an optical signal source 14 and an optical fiber network 16 that carries the optical signal to the optical receiver assembly 12. The optical receiver assembly 12 couples to one or more optical fibers contained within the optical fiber network 16. In the shown embodiment of FIG. 1, the optical receiver assembly 12 includes an optical detector 20, an attenuator 22 and control circuitry 24 coupled to both the optical detector 20 and the attenuator 22.

The optical detector 20 can be any known prior art digital or analog optical detector. Such prior art detectors convert incoming optical signals into corresponding electrical output signals that can be electronically monitored. The electrical output signals produced by the optical detector 20 will correspond to the optical signal received provided that the intensity of the received optical signal falls within the operational range of the optical detector 20.

The optical detector 20 selected for use in the optical receiver assembly 12 should have an operational range with a low intensity threshold at least as low as the minimum signal intensity acceptable for the optical fiber network 16. As will be later explained, the high intensity threshold for the optical detector 20 selected is not of as great an importance. As a result, the optical fiber directing an optical signal to the optical detector 20 may propagate a light signal that is above the minimum threshold intensity for the selected optical detector 20.

The intensity of the light signal traveling through the optical fiber network 16 may be in excess of the intensity range of the optical detector 20. In the optical receiver assembly 12, the attenuator 22 is placed between the signal source 14 and the optical detector 20. Preferably, the attenuator 22 is positioned between the end of the optical fiber emitting the light signal and the optical detector 20. The attenuator 22 selectively reduces the intensity of the light signal to a level that is within the operational range of the optical detector 20.

As has been previously explained, the problem of matching detectors to signal strength is more pronounced in analog applications. As such, even a modest increase in an optical receiver's effective range would be useful. In the preferred embodiment, the attenuator 22 is a micro-mechanical modulator such as a mechanical antireflection switch (MARS) modulator or a Fabry-Perot attenuator. See, for example, 8th Int. Conf. on Sensors and Attenuators, Stockholm, Sweden, Jun. 25–29, 1995, pp 289–292. Although either type of modulator can be used, Fabry-Perot modulators are preferred in systems where a monochromatic signal is used that may vary in intensity. In systems that use polychromatic light or rapidly varying monochromatic light, MARS modulators are preferred.

Micro-mechanical modulators, such as the Fabry-Perot modulator and the MARS modulator, have a variable air gap defined between a substrate and a membrane. Typically, micro-mechanical modulators operate by selectively changing the amount of light reflected in the surface normal direction, i.e., the direction normal to the substrate below the membrane. This is done by varying the size of the air gap that exists in between the substrate and the membrane, thereby altering the optical properties of the device.

Figure 2:
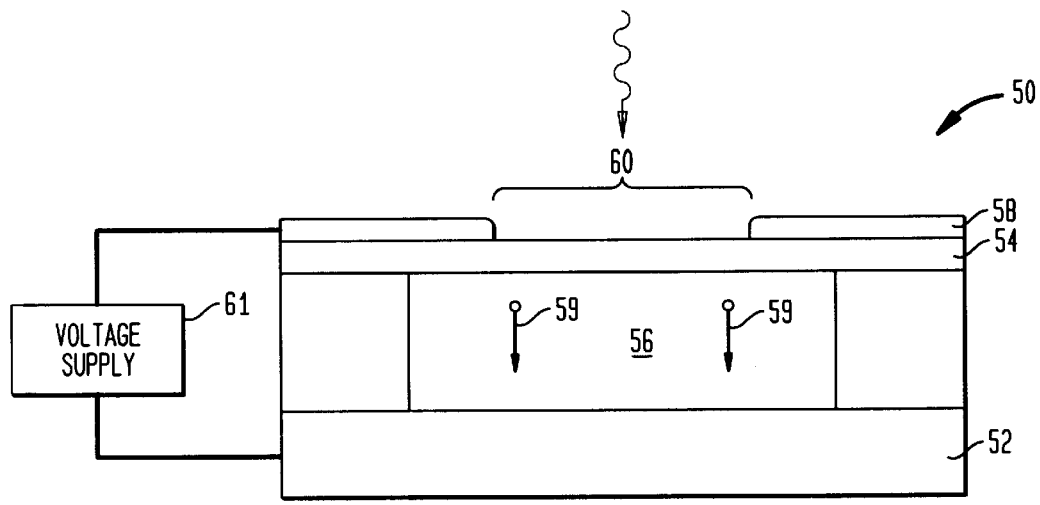
FIG. 2 is cross-sectional schematic view of an exemplary micro-mechanical modulator for use in the present invention.

A typical prior art MARS modulator 50 is shown in FIG. 2. The MARS modulator 50 has a conductive or semiconductive base substrate 52 that is transparent to the operating optical bandwidth of the modulator. Suitable substrate materials include, bit are not limited to, silicon, gallium arsenide, indium phosphate, germanium or indium tin oxide coated glass. If a semiconductor material is used for the substrate 52, the semiconductor material preferably should be appropriately doped to become conductive. For example, if the substrate 52 is silicon, the silicon should be doped with a Group III or Group V element such as phosphorous or boron to enhance operational performance.

A membrane 54 is suspended above the substrate 52, thereby defining an air gap 56 in between the substrate 52 and the membrane 54. The membrane 54 is typically fabricated from a silicon nitride film which is a dielectric. A metal film 58 is deposited around the top periphery of the membrane 54. Since the metal film 58 is optically opaque, only the center of the membrane 54 remains optically active. When an electrostatic potential is applied in between the metal film 58 and the below lying substrate 52, the metal film 58 becomes charged and is deflected by electrostatic forces toward the substrate 52. The electrical potential is supplied by a voltage supply 61. The result is that the membrane 58 deflects downwardly in the direction of arrows 59 and the size of the air gap 66 is reduced. Since the metal film 18 is not present over the optically active area 60 of the MARS modulator 50, no deflection forces are experienced in the optically active area 60 of the membrane 54 when the electrical potential is applied. The result is an optically active area 60 in the membranes 54 that provides substantially uniform optical reflectivity regardless of the degree of deflection, the size of the air gap 56 or the degree of electrostatic potential applied. However, the relative phase between light reflected by the membrane and light reflected by the underlying substrate depends on the applied voltage. Optical interference between these multiple wavefronts cause the fraction of incident light which is reflected and/or transmitted to vary with the applied voltage. Variations of the MARs modulator described are disclosed in U.S. Pat. No. 5,500,761 to Goossen et al, entitled Micromechanical Modulator and U.S. Pat. No. 5,966,235 to Walker, entitled Micro-Mechanical Modulator Having An Improved Membrane Configuration, both of which are assigned to Lucent Technologies, Inc., the assignee herein, and are herein incorporated into this disclosure by reference.

Returning to FIG. 1, it will now be understood that the reflectivity of the attenuator 22 is controlled by the electrostatic potential produced within the attenuator 22. The control circuitry 24 contains the voltage supply 61 of the attenuator 22, wherein the voltage supply 61 controls the electrostatic potential produced within the attenuator 22. Within the control circuitry 24, the voltage supply 61 is coupled to a logic circuit 62, wherein the logic circuit 62 can be a programmed processing unit or a hard wired logic configuration. The logic circuit 62 is also coupled to the output of the optical detector 20.

The optical detector 20 converts a received optical signal into a corresponding electronic signal. The electronic signal produced by the optical detector 20 is read by the logic circuit 62 within the control circuitry 24. The logic circuit 62 regulates the voltage supply 61 of the attenuator 22 depending upon the electronic signal received from the optical detector 20. If the electronic signal received by logic circuit 62 surpasses a predetermined threshold value, the logic circuit 62 detects that the optical signal impinging upon the optical detector 20 is surpassing the intensity range of the optical detector 20. The logic circuit 62 responds by signaling the voltage supply 61 to change the electrostatic potential in the attenuator 22. This causes the attenuator 22 to increase its reflectivity, for example, thereby reducing the intensity of the signal impinging upon the optical detector 20. Once the reflectivity is increased to a point where the light signal is sufficiently attenuated for detection, the reflectivity setting for the attenuator 22 is maintained. If the light signal detected by the optical detector 20 falls below a predetermined threshold level, the logic circuit 62 again signals the voltage supply 61 to change the electrostatic potential in the attenuator 22. In this situation, the change in the voltage supply 61 is meant to decrease the reflectivity of the attenuator 22. This permits more of the optical signal to impinge upon the optical detector 20. The response time of the logic circuit 62 is deliberately designed to be slow as compared to the data transmission rate of the optical signal. As such, no interference occurs between the logic circuit 62 and the data signal.

The active control of the attenuator voltage supply 61 by the logic circuit maintains a predetermined range of optical intensity in the optical signal that is impinging upon the optical detector 20. The predetermined range is at least as small as the operational range for the optical detector 20 selected. A low cost, low bandwidth optical detector 20 can therefore be used. The optical receiver assembly 12 can also be used in any optical system where the intensity of a transmitted signal may change from time-to-time, wherein the optical receiver assembly 12 will automatically adjust itself to the intensity of the signal being received.

Figure 3:
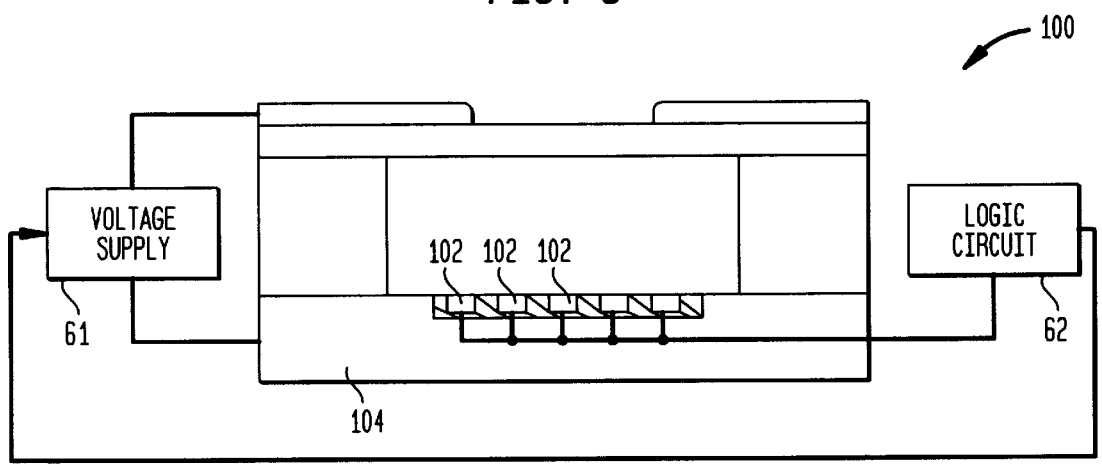
FIG. 3 is a schematic diagram of a primary optical switch in accordance with the present invention.

Referring to FIG. 3, an alternate embodiment of an optical receiver assembly 100 is shown in accordance with the present invention. In this embodiment, the attenuator and the optical detector are fabricated as a single integrated unit. Semiconductor photodetector elements 102 are doped and etched onto a silicon substrate 104 using conventional techniques. Such photodetector elements are described in U.S. Pat. No. 5,784,187, to Cunningham et al., filed Jul. 23, 1996 and U.S. Pat. No. 5,767,997, to Bishop et al., filed Jul. 5, 1996. These applications are both assigned to Lucent Technologies, the assignee herein and are incorporated into this disclosure by reference.

The semiconductor photodetector elements 102 are isolated in the substrate 104 by insulating material. The substrate 104 with the photodetector circuitry is then used as the substrate of the attenuator. Accordingly, the structures required on the substrate for the operation of the attenuator are also formed on the substrate 104 with the photodetector elements 102. The photodetector elements are coupled to a logic circuit 62, as has been previously described. The remainder of the substrate is electrically based by a voltage supply 61 that is controlled by the logic circuit 62. By forming the optical receiver assembly 100 as a single solid state unit, the package is simplified and the need to align the attenuator with the optical detector is eliminated. Furthermore, the single unit optical receiver assembly 100 can be readily fabricated as part of larger electro-optical circuit boards.

Referring back to FIG. 2, it can be seen that a membrane structure 54 is supported over the substrate 52. The membrane structure 54 is separated from the substrate 52 by a dielectric spacer layer 56. The membrane structure 54, substrate 52 and spacer layer 56 define an air gap 58 that extends between the membrane structure 54 and the substrate 52.

It will be understood that the embodiments of the present invention specifically shown and described are merely exemplary and that a person skilled in the art can make alternate embodiments using different configurations and functionally equivalent components. All such alternate embodiments are intended to he included in the scope of this invention as set forth in the following claims.

What is claimed is:

1. An optical assembly for detecting an optical input signal from a signal source, wherein said optical input signal has an average intensity to be set within a predetermined range of possible intensities, said assembly comprising:
   a semiconductor substrate having a first area and at least one other area;
   a photodetector disposed on said substrate in said first area for converting the optical input signal into a corresponding electrical output signal, said photodetector being operational for said predetermined range of input signal intensities;
   at least one conductive element disposed on said substrate in said first area;
   an attenuator membrane suspended above said first area of said substrate, said attenuator membrane being disposed a predetermined distance from said substrate, wherein said predetermined distance is a function of an electrical potential that exists between said at least one conductive element and said attenuator membrane, and wherein said attenuator membrane is capable of lowering the average signal intensity of said optical signal received by said photodetector to a level within said predetermined range of input signal intensities; and
   a logic circuit coupled to both said at east one conductive element and said attenuator membrane for varying said predetermined distance as a function of said output signal of said photodetector, wherein said attenuator membrane attenuates said optical input signal to fall within said predetermined range of input signal intensities.

2. The assembly according to claim 1, wherein said optical input signal travels from said signal source to said photodetector along an optical fiber and said attenuator membrane is disposed between said optical fiber and said photodetector.

3. The assembly according to claim 1, wherein said logic circuit selectively varies said electrical potential as a function of said output signal of said photodetector.

4. An optical receiver assembly, comprising:
   a substrate;
   a moveable membrane suspended a predetermined distance from said substrate;
   a source for applying an electrical potential between the substrate and said moveable member, wherein said predetermined distance is a function of said electrical potential;
   a semiconductor photodetector disposed in said substrate, wherein said photodetector converts light signals into corresponding electrical signals; and
   a control circuit electrically coupled to said photodetector and said source, wherein said control circuit controls said source as a function of said electrical signals produced by said photodetector.

5. The assembly according to claim 4, wherein said photodetector has a predetermined maximum signal intensity capacity and said control circuit controls said source to move said moveable membrane and attenuate a light signal to an average intensity at least as low as said maximum signal capacity.

* * * * *